United States Patent Office 2,923,994
Patented Feb. 9, 1960

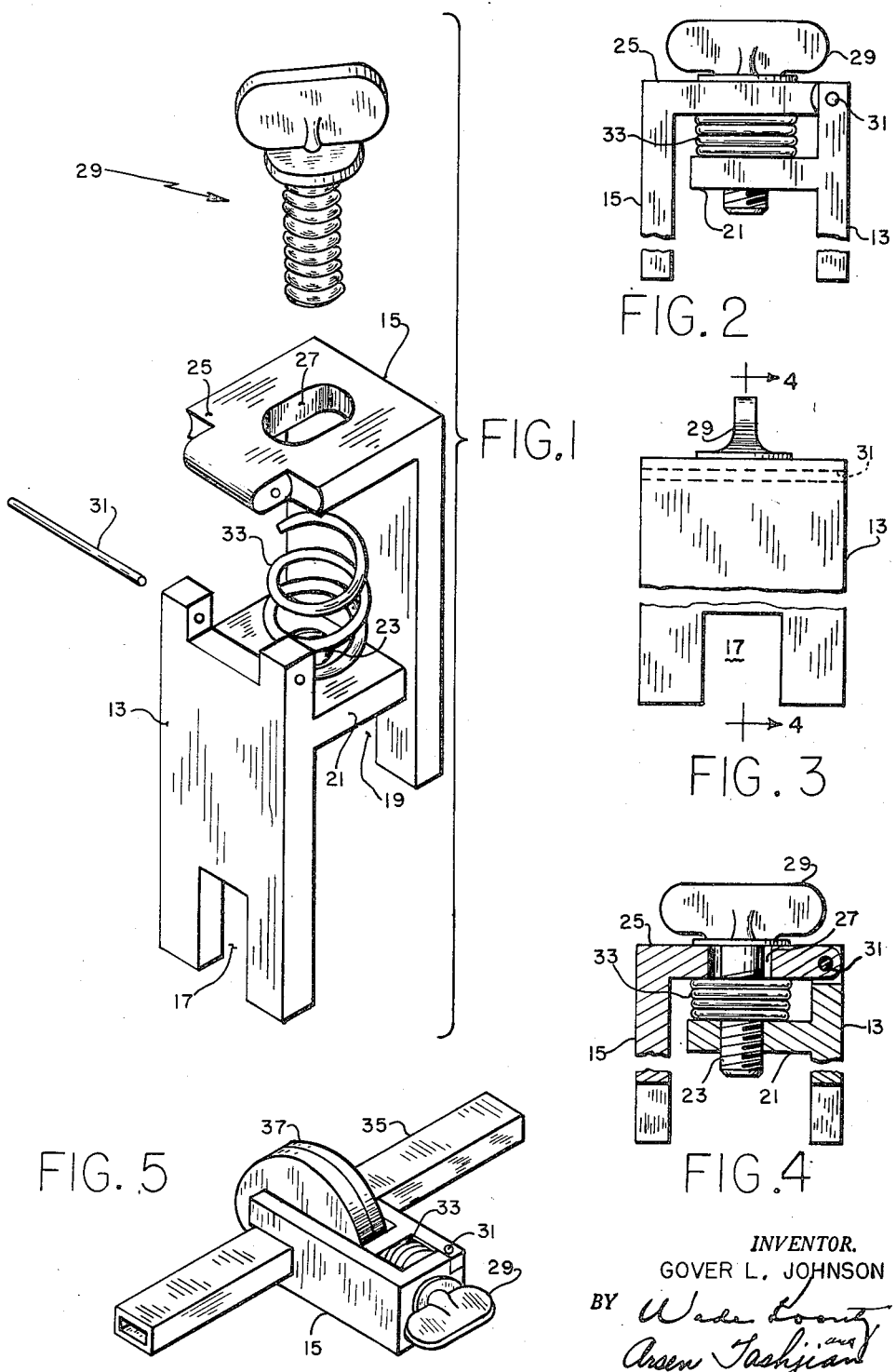

2,923,994
MULTI-BAND WAVE GUIDE JIFFY CLAMP

Gover L. Johnson, Pikesville, Md., assignor to the United States of America as represented by the Secretary of the Air Force Application October 28, 1958, Serial No. 770,245

2 Claims. (Cl. 24—248)

This invention relates to mechanical coupling devices and more particularly to a simple clamp which permits quick connection and disconnection of sections of tubing or conduit such as a wave guide without the use of tools.

In order to join together sections of wave guide of the hollow conducting tube type or to connect the wave guide with other electronic equipment, it is a common practice to provide each section with a flanged end member. These flanges have drilled mating holes therein for receiving threaded members such as screws or bolts which act to join the flanges and attached wave guide sections together. This method of connection takes a considerable amount of time which may be undesirable especially when a large number of connections and disconnections must be made during the testing and measuring phases of the set up. Also, it becomes necessary to use certain hand tools in making the connections and disconnections and these tools are easily lost or mislaid. When the apparatus is in close quarters, it may become exceedingly inconvenient and difficult to use the tools in making the necessary assembly adjustments to the set up.

The present invention is concerned with providing an improved means for quickly connecting and disconnecting the sections of the wave guide without using screws or bolts and the tools which are necessary with that type of fastener. In test equipment where frequent assembly and disassembly are required and where the apparatus includes many branching sections of wave guide, the application and removal of the numerous bolts and nuts required can be time-consuming and awkward.

Accordingly, it is an object of the present invention to provide a means for connecting sections of wave guide including a clamping device which is simple and quick to operate and requires no tools for application on the wave guide.

Another object of the invention is to provide a clamp which is operable to connect sections of wave guide in locations of the electronic apparatus where the use of bolts and the associated tools is difficult or impossible.

A further object of the invention is to provide a clamp for joining sections of wave guide which may be entirely separated from the set up and which requires a minimum of time in attaching and detaching.

A still further object of the invention is to provide a clamp which is usable for joining sections of wave guide which have the ordinary type of flange found on this type of electronic equipment. No special machining is necessary for substituting the present invention in place of the bolts commonly used to assemble the apparatus.

These and other objects, features and advantages of my invention, including the fact that no special tools or skills are required in its utilization, will become more apparent from the following description taken in connection with the illustrative embodiment in the accompanying drawings wherein:

Fig. 1 is an exploded view in perspective of the clamp assembly showing the various parts which make up the assembly;

Fig. 2 is a front view of the assembled clamp;

Fig. 3 is a side view of the clamp;

Fig. 4 is a view along the line 4—4 of Fig. 3 showing the clamp in partial section; and Fig. 5 is a view of the clamp in use showing two sections of wave guide being held together by the clamp.

Referring now to the drawings, particularly Fig. 1, there is shown an exploded view of the wave guide clamp which essentially is a two-piece construction. A pair of jaw members 13 and 15 have the slots 17 and 19 respectively therein for fitting around the wave guide. On the jaw 13 there is located an integrally formed support arm 21 in which a threaded opening 23 is provided. The other jaw 15 has a support member 25 located at its upper end which forms a unitary part thereof. An elongated clearance hole 27 to allow passage of the wing screw 29 is provided in said support member 25.

The jaws 13 and 15 are mounted in such a manner that the pin 31 permits the jaws to pivot relative to one another and thus form a hinge joint. The spring 33 is inserted between the support arm 21 and member 25 and acts to hold the clamp in the open position so that it can be easily placed around the flanges of the wave guide.

Since the clamp is held open by the spring 33, it becomes necessary to use only one hand in attaching the clamp to the wave guide leaving the other hand free to hold the wave guide sections together and to rotate the wing screw 29 thereby tightening the clamp. The simplicity of construction adds considerably to its usefulness and value. It can be seen that the two main parts of the clamp (jaw members 13 and 15) can be easily fabricated from available standard shaped stock like angle iron or bar stock.

The wave guide clamp operates by positioning the openings 17 and 19 in the jaws 13 and 15 around the wave guide 35 as shown in Fig. 5 and sliding the clamp inward so as to straddle the flanged portions 37. The wing screw 29 is then tightened to cause the jaws to pivot around the pin 31 and press against the sides of the flanges 37. Continued tightening of the wing screw 29 results in the sealing of the wave guide sections so that there is less chance of leakage of energy through the joint.

It will be understood that the description and drawings include only a single preferred embodiment of my invention and that changes may be made in the construction, proportion, and arrangement of the parts making the clamp adaptable for use with wave guides of different shapes and other flanged objects of the same general shape as wave guides, without departing from the true spirit and scope of the invention.

What is claimed is:

1. A clamp for quickly coupling elements which have flanged end portions comprising, a pair of jaw members provided with slots therein for fitting around adjacent flanged end portions, the first of said jaw members including a first transverse support arm having a threaded opening therein, the second of said jaw members including a second transverse support arm having a clearance hole therein, said jaw members being pivotally attached to each other, a threaded member adapted to pass through the clearance hole in said second jaw member and into the threaded opening in said first jaw member, said clearance hole being sufficiently greater in size than said threaded member to allow said jaw members to pivot relative to each other, a coil spring disposed between said first and second transverse support arms, said spring operating to force said support arms away from each other when said threaded member is loosened, tightening of said threaded member operating to pivot the jaw members and vary the relative spacing between said first and second support arms so as to correspondingly vary the relative spacing between said first and second jaw members thereby applying clamping pressure to the sides of the flanged end portions of the coupled elements.

2. A clamp for coupling two flanged elements comprising, a pair of jaw members provided with slots in the lower ends thereof to allow said clamp to be fitted around adjacent flanged elements, the first of said jaws including a first transverse support arm disposed near its upper end extending at substantially right angles therefrom and having a threaded opening therein, said first jaw also including a pair of ears with hinge pin receiving openings therein formed at its upper end, the second of said jaws including a second transverse support arm disposed at its upper end and extending at substantially right angles therefrom and having a clearance opening therein, said second support arm having an outer end portion with a hinge pin receiving opening therein adapted to engage the ears on said first jaw member, a hinge pin for pivotally attaching said jaw members to one another, a threaded member adapted to pass through the clearance hole in said second support arm and into the threaded opening in said first support arm, said clearance hole being sufficiently greater in size than said threaded member to allow said jaw members to pivot relative to each other, a coil spring disposed between said first and second support arms and retained in position by said threaded member, said spring operating to force said support arms away from each other when said threaded member is loosened, tightening of said threaded member operating to pivot the jaw members and vary the relative distance between said first and second support arms so as to correspondingly vary the relative spacing between said first and second jaw members thereby applying clamping pressure to the sides of the flanged end portions of the coupled elements.

References Cited in the file of this patent

UNITED STATES PATENTS

| | | |
|---|---|---|
| Re. 19,304 | Marogg | Sept. 4, 1934 |
| D. 138,285 | Schneiderwind | July 11, 1944 |
| 440,655 | Sawyer | Nov. 18, 1890 |
| 1,519,210 | McGuckin | Dec. 16, 1924 |
| 1,739,090 | Richards | Dec. 10, 1929 |
| 1,836,890 | Young | Dec. 15, 1931 |
| 2,043,555 | Preston | June 9, 1936 |
| 2,613,243 | Frear | Oct. 7, 1952 |
| 2,691,201 | Matthews | Oct. 12, 1954 |